United States Patent (10) Patent No.: US 9,098,491 B2
Gu et al. (45) Date of Patent: Aug. 4, 2015

(54) METHOD AND SYSTEM FOR PERFORMING DATA TRANSFER WITH A FLASH STORAGE MEDIUM

(71) Applicant: Hong Kong Applied Science and Technology Research Institute Company Limited, Hong Kong (HK)

(72) Inventors: Weiqing Gu, Shenzhen (CN); Xiaoji Wang, Shenzhen (CN); Xianzhi Tang, Shenzhen (CN); Conghao Sun, Shenzhen (CN); Fangyao Chen, Shenzhen (CN)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 428 days.

(21) Appl. No.: 13/684,242

(22) Filed: Nov. 23, 2012

(65) Prior Publication Data

US 2014/0149637 A1 May 29, 2014

(51) Int. Cl.
*G06F 13/28* (2006.01)
*G06F 13/12* (2006.01)
*G06F 13/00* (2006.01)
G06F 13/16 (2006.01)
G06F 3/06 (2006.01)
G06F 12/08 (2006.01)

(52) U.S. Cl.
CPC .............. *G06F 13/28* (2013.01); *G06F 13/00* (2013.01); *G06F 13/12* (2013.01); *G06F 3/0601* (2013.01); *G06F 3/0602* (2013.01); *G06F 3/0604* (2013.01); *G06F 3/0607* (2013.01); *G06F 3/0628* (2013.01); *G06F 3/0646* (2013.01); *G06F 3/0655* (2013.01); *G06F 3/0656* (2013.01); *G06F 12/0868* (2013.01); *G06F 13/1673* (2013.01)

(58) Field of Classification Search
None
See application file for complete search history.

(56) References Cited

U.S. PATENT DOCUMENTS 6,049,841 A * 4/2000 Fields et al. ..................... 710/28
8,595,411 B2 * 11/2013 Selinger et al. ............... 711/103
2008/0034159 A1 2/2008 Kim
2011/0161554 A1 6/2011 Selinger et al.
2011/0264852 A1 10/2011 Zhang et al.

OTHER PUBLICATIONS

Kang, J.-U., Kim, J.-S., Park, C., Park, H., and Lee, J. (2007), "A multi-channel architecture for high-performance NAND flash-based storage system," Journal of Systems Architecture, vol. 53, pp. 644-658, 2007.

*Primary Examiner* — Midys Rojas
(74) *Attorney, Agent, or Firm* — Ella Cheong Hong Kong; Sam T. Yip

(57) ABSTRACT

This invention discloses a method for data transfer between a host memory and a flash memory module through direct memory access (DMA), and a related data-transfer subsystem. In one embodiment, the subsystem comprises a DMA controller, a flash-memory controller, a data buffer for buffering data transferred between the DMA controller and the flash-memory controller, and a status-register group for storing a current status of the data buffer. The DMA controller and the flash-memory controller are configured such that both of them are allowed to update the current status and to detect a change of the current status during the data transfer, so that a substantial part of the data transfer's process is executed through direct interaction between the DMA controller and the flash-memory controller without involving a central processing unit. The subsystem may further comprise a command storing unit for storing command packages for execution by the flash-memory controller.

19 Claims, 2 Drawing Sheets

METHOD AND SYSTEM FOR PERFORMING DATA TRANSFER WITH A FLASH STORAGE MEDIUM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a high efficiency data-transfer method used in a storage system, especially a flash memory storage system.

BACKGROUND

Flash memory is a type of non-volatile electronic storage medium that can be electronically erased and reprogrammed, thus well suited as a rewritable, compact data-storage medium used in electronic systems, in computer systems, and especially in mobile devices.

NAND flash memory is one of the main types of flash memory that uses floating-gate transistors connected serially in a NAND gate fashion. The NAND flash memory is widely used in computer systems, digital cameras, portable music players, USB flash drives, memory cards, and SmartMedia™ cards. Particularly in computer systems and persistent data storage systems, it is increasingly common that magnetic disk-based data storage media are being replaced by solid state disks that utilize NAND flash memories as these solid state disks maintain certain advantages over magnetic disk-based data storage media in that they have less power consumption, better physical shock resistance and electromagnetic compatibility characteristics, smaller physical size, and lower weight.

NAND flash memories come in different capacities and electronic architectures depending on the manufacture, model, and technology used. For example, memory banks in a NAND flash memory device are arranged into blocks with sizes including but not limited to 256K, 512K, 1M, or 2M bytes. Each block is further organized into pages. The number of pages can be 32, 64, 128, or more with each page having a possible size of 256, 512, 1K, 2K, 4K, 8K bytes or more. Other technical variations arise in other attributes such as block type, address cycles, and size of spare memory space.

In general the data storage operations of NAND flash memories comprise three basic operations: page read, page program (or equivalent to write), and block erase. Before a page can be programmed or re-programmed, a block erase of the block containing the page must be performed first. The speeds of the operations are asymmetrical. A page read is much faster than a page program or block erase. In addition, memory cells of NAND flash memories have limited lifespan. A memory cell will wear out after certain number of erase-cycles. Typically, a single-level-cell (SLC) has a life of 100,000 erase-cycles, and a multi-level-cell (MLC) has a life of 3,000 to 10,000 erase-cycles. Thus, various data storage operation schemes have been developed to minimize the block erase operations and spread the block erase operations evenly to all blocks.

In the art, execute in place (XIP) is a method of executing a program directly from a long-term storage rather than copying the program into a RAM first. A NAND flash memory is a typical non-XIP memory. A non-XIP memory does not provide an interface directly connectable with a central processing unit (CPU). Furthermore, the non-XIP memory is not directly connectable with a memory in a host, such as RAM, for data transfer because of the aforementioned differences between a RAM and the NAND flash memory or the non-XIP memory in general. A flash-memory controller is required to facilitate data transfer between the non-XIP memory and a host memory or a CPU.

FIG. 1 is a schematic diagram showing a typical arrangement of transferring data between a host memory and one or more flash memory modules through direct memory access (DMA). Consider, for example, that a command of writing data from the host memory to a flash memory module is received by a CPU. The CPU instructs a DMA controller to transfer a page of data from the host memory to a data buffer that is coupled to the DMA controller and a flash-memory controller. After the page of data is transferred to the data buffer, the DMA controller may submit an interrupt to the CPU. Upon receiving the interrupt, the CPU is aware that the page of data in the data buffer is ready. Alternatively, the CPU may be informed by regularly polling the DMA controller. Then the CPU issues a program command, optionally prior to an erase command, to the flash-memory controller to write the page of data from the data buffer to the flash memory module. When the program command is done, the CPU is informed about its completion by the flash-memory controller sending an interrupt to the CPU or by the CPU regularly polling the flash-memory controller. The CPU then repeats the process of instructing the DMA to load another page to the data buffer followed by commanding the flash-memory controller to do a program operation until all the data are transferred. The process is almost the same in a read operation. Interrupt or polling is also needed in an erase operation. As the process is repeated many times, a high CPU load is resulted. Furthermore, it leads to low efficiency for the CPU in that a new flash-operation command can be issued only after completion of a previous command (both commands being for the same flash memory module).

There is a need in the art for a method to transfer data between a host memory and a flash memory module with reduced CPU load and/or increased CPU efficiency to achieve an improvement over the aforementioned typical arrangement.

SUMMARY OF THE INVENTION

A first aspect of the present invention is a data-transfer subsystem configured to enable data transfer through DMA between a host memory and any of one or more flash memory modules supportable by the subsystem. The subsystem comprises: a DMA controller; a flash-memory controller; a data buffer coupled to the DMA controller and the flash-memory controller, for buffering data transferred between the DMA controller and the flash-memory controller; and a status-register group accessible by the DMA controller and the flash-memory controller, for storing a current status of the data buffer, the current status being related to the data transfer. The DMA controller includes at least a functionality of transferring data to and from the host memory. The flash-memory controller has at least a functionality of transferring data to and from any of the one or more flash memory modules. Furthermore, the DMA controller and the flash-memory controller are configured such that both of them are allowed to read and update the current status and to detect a change of the current status during the data transfer, so that a substantial part of the data transfer's process is executed through direct interaction between the DMA controller and the flash-memory controller without involving a CPU. Thereby, the CPU load can be reduced.

Preferably, the data-transfer subsystem further comprises a command storing unit. The command storing unit receives command packages, each of which includes an operation type specifying a command executable by the flash-memory controller, and is directed to a target flash memory module selected from the one or more flash memory modules. It is preferable that the command packages are received from the CPU. In addition, the command storing unit is configured to store the command packages in one or more ordered sequences according to the target flash memory modules that the command packages are directed to, wherein the command packages stored in any of the one or more ordered sequences are arranged in order of the command packages' received times or received orders. The flash-memory controller is allowed to retrieve the command packages stored in a selected sequence one-by-one according to the selected sequence's order.

A second aspect of the present invention is a method for enabling data transfer between host memory and a flash memory module through DMA. When a host command related to this data transfer is received, a CPU configures a DMA controller and a flash-memory controller to carry out the host command. In particular, the CPU configures the flash-memory controller by generating one or more command packages arranged as an ordered sequence for sequential execution by the flash-memory controller. The flash-memory controller sequentially executes the one or more command packages one-by-one according to the ordered sequence's order until all the one or more command packages are executed. The sequential execution is such that, before execution of a first command package selected from the one or more command packages is complete, execution of a second command package that follows the first command package is not initiated. The DMA controller and the flash-memory controller checks and updates a current status of the data buffer where the current status is related to the data transfer, in order to enable, without involving the central processing unit, direct interaction between the DMA controller and the flash-memory controller in executing a substantial part of the data transfer's process. Furthermore, the DMA controller and the flash-memory controller are configured such that the following two results are realized. First, during the execution of the first command package, if the current status checked by the flash-memory controller does not match a first value, the flash-memory controller waits until the DMA controller updates the current status with the first value. Second, when the execution of the first command package is complete, the flash-memory controller updates the current status with a second value, such that completion of the execution of the first command package is detectable by the DMA controller upon checking the current status. Preferably, the first value is a command-initiating value provided in the first command package, and the second value is a command-done value provided in the first command package.

Preferably, after generating the one or more command packages, the CPU stores all the one or more command packages to a command storing unit. Thereby, the flash-memory controller is allowed to retrieve the one or more command packages for sequential execution directly from the command storing unit without a need to further involve the CPU.

DETAILED DESCRIPTION

Figure 1:
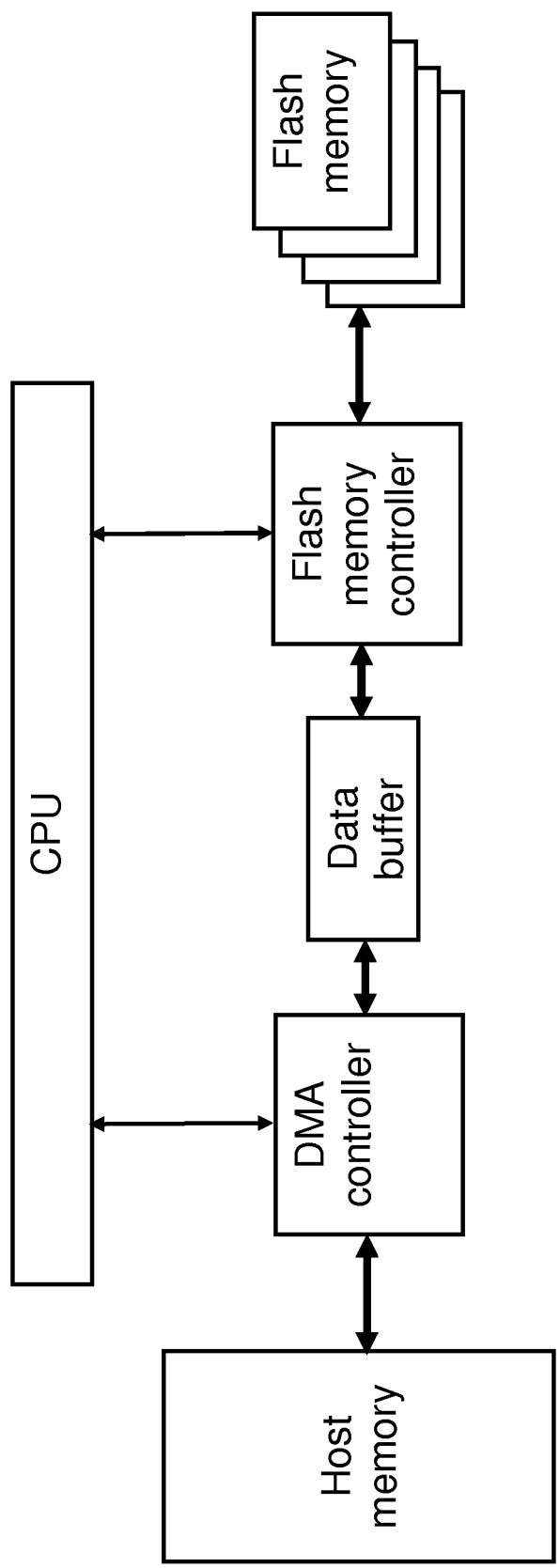
FIG. 1 depicts a typical arrangement used for transferring data between a host memory and one or more flash memory modules through DMA.
Figure 2:
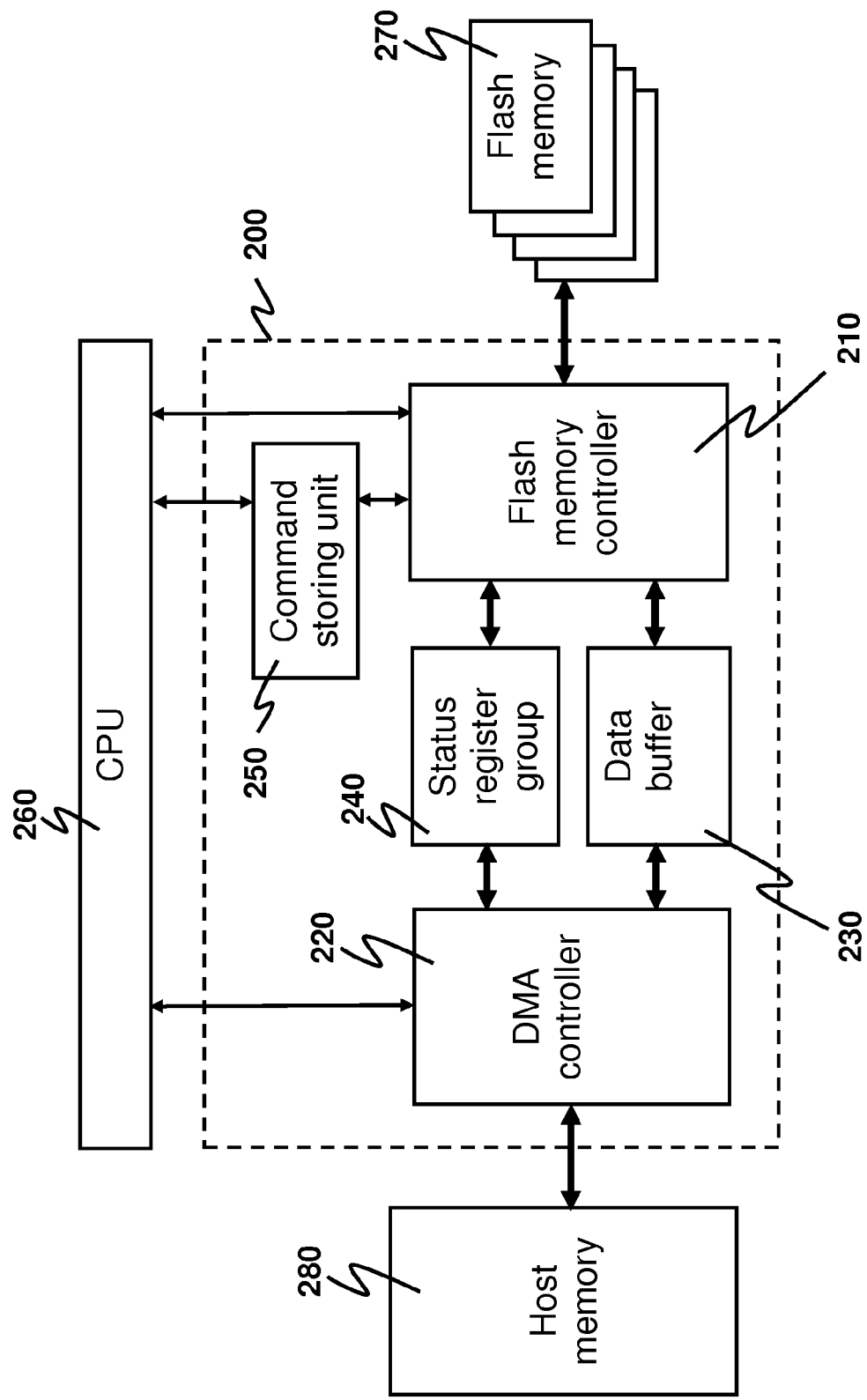
FIG. 2 shows a data-transfer subsystem for enabling data transfer between a host memory and one or more flash memory modules in accordance with an exemplary embodiment of the present invention.

A first aspect of the present invention is a data-transfer subsystem configured to enable data transfer through DMA between a host memory and any of one or more flash memory modules supportable by the subsystem. The subsystem may be used in a storage system including, but not limited to, a SATA (Serial Advanced Technology Attachment) device, a USB (Universal Serial Bus) device, and a PCIE (Peripheral Component Interconnect Express) device. FIG. 2 depicts an exemplary embodiment of the data-transfer subsystem disclosed in the present invention.

A data-transfer subsystem 200 comprises a DMA controller 220 and a flash-memory controller 210. The DMA controller 220 includes at least a functionality of transferring data to and from a host memory 280, and is configured to perform data transfer to and from the host memory 280 by DMA. The host memory 280, for example, may be a RAM or a bank of RAMs. The flash-memory controller 210 includes at least a functionality of transferring data to and from any of one or more flash memory modules 270. Each of the one or more flash memory modules 270 may be, for example, a NAND flash memory, a non-XIP memory, or any non-volatile flash storage medium. In case the NAND flash memory is used, the flash-memory controller 210 is dedicated to perform NAND flash commands, which are related to operations including, but not limited to, Erase, Program, Read, Read Status, Reset, and Multi-Plane commands. In general, a command set employed by the flash-memory controller 210 is based upon the memory type. Optionally, the flash-memory controller 210 may be configured as having one or more channels as viewed from the host, where each of the one or more channels is used for transferring data from the host to a unique flash memory module selected from the one or more flash memory modules 270. The flash-memory controller 210 may be implemented in the subsystem 200 as one unique electronic device, or as a number of electronic devices each of which takes care of a subset of the one or more flash memory modules 270.

In the subsystem 200, a data buffer 230, coupled to the DMA controller 220 and the flash-memory controller 210, is used for buffering data transferred between the DMA controller 220 and the flash-memory controller 210. Buffering of data is required because of the page-wise read/write characteristic of a typical flash memory. For example, in a page read operation, a page of data is loaded into the data buffer 230 by the flash-memory controller 210, and then the DMA controller 220 transfers the page of data from the data buffer 230 to the host memory 280 through DMA. The data buffer 230 may be realized by a RAM or a plurality of RAMs, either single-port or dual-port. The subsystem 200 further comprises a status-register group 240 accessible by the DMA controller 220 and the flash-memory controller 210. A current status of the data buffer 230 is stored in the status-register group 240.

In particular, the current status is related to a data transfer between the host memory 280 and a dedicated flash memory module that is under consideration. This dedicated flash memory module is selected from the one or more flash memory modules 270. It follows that if more than one flash memory modules are supportable by the subsystem 200, there may be more than one current status stored in the data buffer 230. The status-register group 240, as a means for storing, may be realized by a RAM (single-port or dual-port) or a register group.

Furthermore, the DMA controller 220 and the flash-memory controller 210 are configured such that the DMA controller 220 and the flash-memory controller 210 are allowed to update the current status and to detect a change of the current status during the data transfer. In the art, it is generally regarded that concurrent updating of a memory location by two different computing devices is undesirable. Herein in the specification and in the appended claims, a DMA controller and a flash-memory controller being allowed to update a current status means that the DMA controller and the flash-memory controller are allowed to individually update the current status but both the DMA controller and the flash-memory controller are not configured to concurrently update the current status at any one time. The current status is updated after completion of a task or an operation by either the DMA controller 220 or the flash-memory controller 210. In addition, the updated current status is selected from a set of pre-agreed values used in the subsystem 200 so that completion of a task or an operation by either the DMA controller 220 or the flash-memory controller 210 is detectable by the other one through checking the current status. The provision of updating the current status and detecting the change thereof enables direct interaction between the DMA controller 220 and the flash-memory controller 210. Completion of each flash-operation command by the flash-memory controller 210 needs not be informed to the CPU 260 through an interrupt or by polling, and the CPU 260 is also not required to inform the DMA controller 220 to start a next operation in response to completion of a previous flash-operation command done by the flash-memory controller 210. The flash-memory controller 210 is only required to inform the CPU 260 in case exceptional events happen, such as when an erase/program command fails or when a data integrity test of the flash-memory data fails. It follows that a substantial part of the data transfer's process is executed through the direct interaction between the DMA controller 220 and the flash-memory controller 210 without involving a CPU 260, so that the CPU load can be reduced.

It is preferable that the subsystem 200 further comprises a command storing unit 250. The command storing unit 250 is configured to receive and store command packages. Each of the command packages includes an operation type specifying a command executable by the flash-memory controller 210, and is directed to a target flash memory module selected from the one or more flash memory modules 270. That is, the command, as specified by the operation type, is a flash operation performed for the target flash memory module. Examples of the flash operation include Erase, Program, Read, Read Status, Reset, and Multi-Plane commands. In the command storing unit 250, the command packages are stored in one or more ordered sequences according to the target flash memory modules that the command packages are directed to. In any of the one or more ordered sequences, the command packages are arranged in order of the command packages' received times or received orders. The command storing unit 250 is further configured to allow the flash-memory controller 210 to retrieve the command packages stored in a selected sequence one-by-one according to the selected sequence's order, wherein the selected sequence is any one of the one or more ordered sequences.

The command packages may be received from the CPU 260 or from another processor or co-processor that generates such command packages. Optionally, the command packages may be received in batch from the CPU 260, thereby allowing pipeline transmission of these command packages from the CPU 260 to the command storing unit 250 so that the CPU efficiency can be increased by utilizing inherent concurrency in the pipeline transmission without any interrupt from the flash-memory controller 210 or regularly polling the flash-memory controller 210.

Apart from an operation type that specifies a command executable by the flash-memory controller 210, a command package may further include other data usable for the execution of the command. These other data may comprise: a command-initiating value for indicating to the flash-memory controller 210 to initiate execution of the command when the current status matches the command-initiating value; and a command-done value, with which the current status is updated by the flash-memory controller 210 when the command is done. These other data may further include: an address of the target flash memory module; an address of the data buffer if the command is related to a read operation or a write operation; and a list of meta data for supporting execution of the command by the flash-memory controller 210.

The command storing unit 250 may be realized by a RAM or a plurality of RAMs. Optionally, the command storing unit 250 may be implemented by one or more first-in first-out (FIFO) memory devices where each of the FIFO memory devices stores one ordered sequence of command packages.

Optionally, the command storing unit 250 may comprise one or more command storing subunits each of which is configured to store the command packages in a unique ordered sequence selected from the one or more ordered sequences. The number of the one or more command storing subunits equals the number of the one or more flash memory modules 270 supportable by the subsystem 200.

Optionally, the data buffer 230 may comprise one or more constituent buffers each of which is for buffering data originated from or to be directed to a unique, dedicated flash memory module selected from the one or more flash memory modules. Similarly, the status-register group 240 may comprise one or more status registers each of which stores the current status of a unique constituent buffer selected from the one or more constituent buffers. The number of the one or more status registers equals the number of the one or more constituent buffers.

A second aspect of the present invention is a method for enabling data transfer between a memory embedded in a host and a flash memory module through DMA. The host includes a DMA controller for transferring data to and from the host memory, a flash-memory controller for transferring data to and from the flash memory module, and a data buffer being used for buffering data transferred between the DMA controller and the flash-memory controller. Examples of the host include, but are not limited to, a SATA device, a USB device and a PCIE device. Examples of the flash memory module include a NAND flash memory, a non-XIP memory and a non-volatile flash storage medium. In case the flash memory module is a NAND flash memory, the flash-memory controller is dedicated to perform NAND flash commands. The data buffer may be realized by a RAM or a plurality of RAMs, either single-port or dual-port.

The disclosed method is detailed as follows, with the aid of FIG. 2 for illustration. When a CPU 260 receives a host command related to transferring data between a host memory 280 and a flash memory module 270, the CPU 260 analyzes the host command so as to configure a DMA controller 220 and a flash-memory controller 210 to carry out the host command. In particular, the CPU 260 configures the flash-memory controller 210 by generating one or more command packages, substantially similar to the ones described above in the first aspect of the invention, arranged as an ordered sequence for sequential execution by the flash-memory controller 210. The flash-memory controller 210 sequentially executes the one or more command packages one-by-one according to the ordered sequence's order until all the one or more command packages are executed. In the sequential execution of the one or more command packages, overlapping of execution of different command packages is not allowed. That is, before execution of a first command package selected from the one or more command packages is complete, execution of a second command package that follows the first command package is not initiated. In the disclosed method, the DMA controller 220 and the flash-memory controller 210 are allowed to check and update a current status of a data buffer 230 where the current status is related to the data transfer between the host memory 280 and the flash memory module 270, in order to enable direct interaction between the DMA controller 220 and the flash-memory controller 210, without involving the CPU 260, in executing a substantial part of the data transfer's process. The advantage of this direct interaction is described above in the first aspect of the invention. Furthermore, the DMA controller 220 and the flash-memory controller 210 are configured in order to realize the following two desired results. Take a flash program operation for example. First, during the execution of the first command package, if the current status checked by the flash-memory controller 210 does not match a first value, the flash-memory controller 210 waits until the DMA controller 220 updates the current status with the first value. Second, when the execution of the first command package is complete, the flash-memory controller 210 updates the current status with a second value, such that completion of the execution of the first command package is detectable by the DMA controller 220 upon checking the current status. In the two aforementioned cooperative actions, the first value and the second value are values pre-agreed between the DMA controller 220 and the flash-memory controller 210. Optionally, the first value is a command-initiating value provided in the first command package, and the second value is a command-done value provided in the first command package. The process is similar in a flash read operation.

Preferably, after generating the one or more command packages, the CPU 260 stores all the one or more command packages to a command storing unit 250. It follows that the flash-memory controller 210 is allowed to retrieve the one or more command packages for sequential execution directly from the command storing unit 250 without a need to further involve the CPU 260 to thereby increase the CPU efficiency as described above in the first aspect of the invention.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A data-transfer subsystem configured to enable data transfer through direct memory access (DMA) between a host memory and any of one or more flash memory modules supportable by the subsystem, the subsystem comprising:
   a DMA controller for at least transferring data to and from the host memory;
   a flash-memory controller for at least transferring data to and from any of the one or more flash memory modules;
   a data buffer coupled to the DMA controller and the flash-memory controller, for buffering data transferred between the DMA controller and the flash-memory controller;
   a status-register group accessible by the DMA controller and the flash-memory controller, for storing a current status of the data buffer, the current status being related to the data transfer; and
   a command storing unit configured to:
      receive command packages, each of which includes an operation type specifying a command executable by the flash-memory controller, and is directed to a target flash memory module selected from the one or more flash memory modules;
      store the command packages in one or more ordered sequences according to the target flash memory modules that the command packages are directed to, wherein the command packages stored in any of the one or more ordered sequences are arranged in order of the command packages' received times or received orders; and
      allow the flash-memory controller to retrieve the command packages stored in a selected sequence one-by-one according to the selected sequence's order, wherein the selected sequence is any one of the one or more ordered sequences;
   wherein each of the command packages further includes:
      a command-initiating value for indicating to the flash-memory controller to initiate execution of the command when the current status matches the command-initiating value;
      a command-done value, with which the current status is updated by the flash-memory controller when the command is done;
      an address of the target flash memory module;
      an address of the data buffer if the command is related to a read operation or a write operation; and
      a list of meta data for supporting execution of the command by the flash-memory controller;
   wherein the DMA controller and the flash-memory controller are configured such that the DMA controller and the flash-memory controller are allowed to update the current status and to detect a change of the current status during the data transfer, so that a substantial part of the data transfer's process is executed through direct interaction between the DMA controller and the flash-memory controller without involving a central processing unit.

2. The data-transfer subsystem of claim 1, wherein the command packages are received from the central processing unit.

3. The data-transfer subsystem of claim 1, wherein the command is related to an operation of Erase, Program, Read, Read Status, Reset, or Multi-Plane commands.

4. The data-transfer subsystem of claim 1, wherein the command storing unit comprises one or more command storing subunits each of which is configured to store the command packages in a unique ordered sequence selected from the one or more ordered sequences, the number of the one or more command storing subunits being equal to the number of the one or more flash memory modules.

5. The data-transfer subsystem of claim 1, wherein:
the data buffer comprises one or more constituent buffers each of which is for buffering data originated from or to be directed to a dedicated flash memory module selected from the one or more flash memory modules; and
the status-register group comprises one or more status registers each of which stores the current status of a unique constituent buffer selected from the one or more constituent buffers, the number of the one or more status registers being equal to the number of the one or more constituent buffers.

6. The data-transfer subsystem of claim 1, wherein each of the one or more flash memory modules is a NAND flash memory, a non-XIP (non-execute-in-place) memory, or a non-volatile flash storage medium.

7. The data-transfer subsystem of claim 1, wherein the data buffer is realized by a random access memory (RAM) or a plurality of RAMs, either single-port or dual-port.

8. The data-transfer subsystem of claim 1, wherein the flash-memory controller is dedicated to perform NAND flash commands, or commands in any other command set according to memory type.

9. The data-transfer subsystem of claim 1, wherein the subsystem is used in a SATA (Serial Advanced Technology Attachment) device or a USB (Universal Serial Bus) device or a PCIE (Peripheral Component Interconnect Express) device or any other device.

10. A method for enabling data transfer between a host memory and a flash memory module through direct memory access (DMA), a DMA controller being used for transferring data to and from the host memory, a flash-memory controller being used for transferring data to and from the flash memory module, a data buffer being used for buffering data transferred between the DMA controller and the flash-memory controller, the method comprising:
when a host command related to transferring data between the host memory and the flash memory module is received, configuring, by a central processing unit, the DMA controller and the flash-memory controller to carry out the host command, wherein the central processing unit configures the flash-memory controller by generating one or more command packages arranged as an ordered sequence for sequential execution by the flash-memory controller;
sequentially executing, by the flash-memory controller, the one or more command packages one-by-one according to the ordered sequence's order until all the one or more command packages are executed, wherein before execution of a first command package selected from the one or more command packages is complete, execution of a second command package that follows the first command package is not initiated;
configuring the DMA controller and the flash-memory controller to check and update a current status of the data buffer, the current status being related to the data transfer, such that:
during the execution of the first command package, if the current status checked by the flash-memory controller does not match a first value, the flash-memory controller waits until the DMA controller updates the current status with the first value; and
when the execution of the first command package is complete, the flash-memory controller updates the current status with a second value, such that completion of the execution of the first command package is detectable by the DMA controller upon checking the current status;
so as to enable direct interaction between the DMA controller and the flash-memory controller without involving the central processing unit in executing a substantial part of the data transfer's process.

11. The method of claim 10, wherein:
the first value is a command-initiating value provided in the first command package; and
the second value is a command-done value provided in the first command package.

12. The method of claim 10, further comprising:
after generating the one or more command packages, storing, by the central processing unit, all the one or more command packages to a command storing unit, thereby allowing the flash-memory controller to retrieve the one or more command packages for sequential execution directly from the command storing unit without a need to further involve the central processing unit.

13. The method of claim 10, wherein each of the command packages includes:
an operation type specifying a command executable by the flash-memory controller;
a command-initiating value for indicating to the flash-memory controller to initiate execution of the command when the current status matches the command-initiating value;
a command-done value, with which the current status is updated by the flash-memory controller when the command is done;
an address of the flash memory module;
an address of the data buffer if the command is related to a read operation or a write operation; and
a list of meta data for supporting execution of the command by the flash-memory controller.

14. The method of claim 13, wherein the command is related to an operation of Erase, Program, Read, Read Status, Reset, or Multi-Plane commands.

15. The method of claim 10, wherein the flash memory module is a NAND flash memory, a non-XIP (non-execute-in-place) memory, or a non-volatile flash storage medium.

16. The method of claim 10, wherein the data buffer is realized by a random access memory (RAM) or a plurality of RAMs, either single-port or dual-port.

17. The method of claim 10, wherein the flash-memory controller is dedicated to perform NAND flash commands, or commands in any other command set according to memory type.

18. The method of claim 10, wherein the method is used for a SATA (Serial Advanced Technology Attachment) device or a USB (Universal Serial Bus) device or a PCIE (Peripheral Component Interconnect Express) device or any other device.

19. A system comprising a central processing unit, and a data-transfer subsystem configured to enable data transfer through direct memory access (DMA) between a host memory and a flash memory module supportable by the subsystem, the data-transfer subsystem comprising:
a DMA controller for transferring data to and from the host memory;
a flash-memory controller for transferring data to and from the flash memory module; and
a data buffer for buffering data transferred between the DMA controller and the flash-memory controller;
wherein the data-transfer subsystem is configured to enable the data transfer according to the method of claim 10.

* * * * *